May 1, 1934. G. A. LASLEY 1,957,027
MAUSOLEUM AND PROCESS AND APPARATUS FOR MAKING THE SAME
Filed Aug. 22, 1932 3 Sheets-Sheet 1
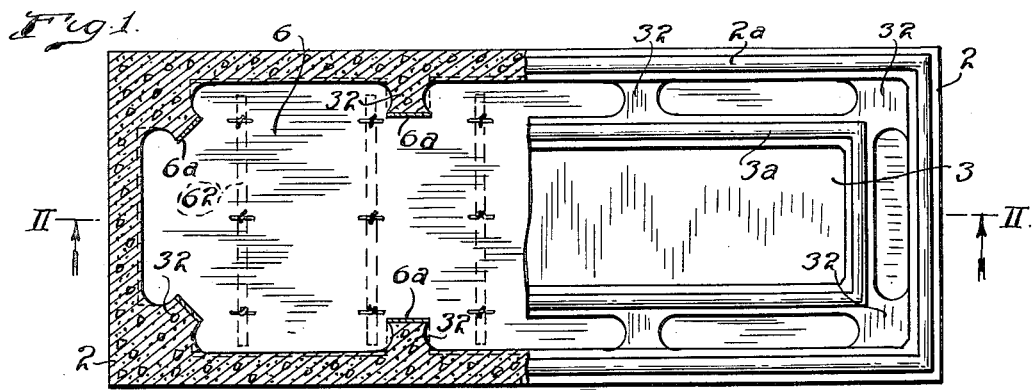
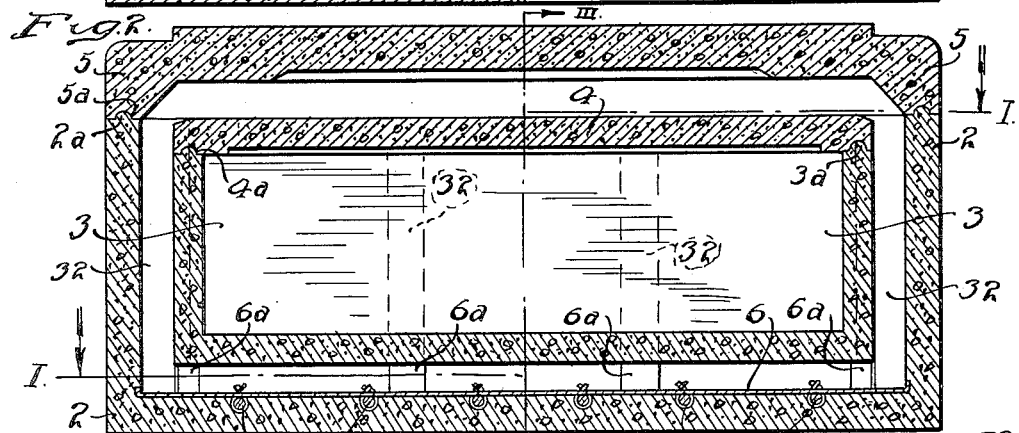
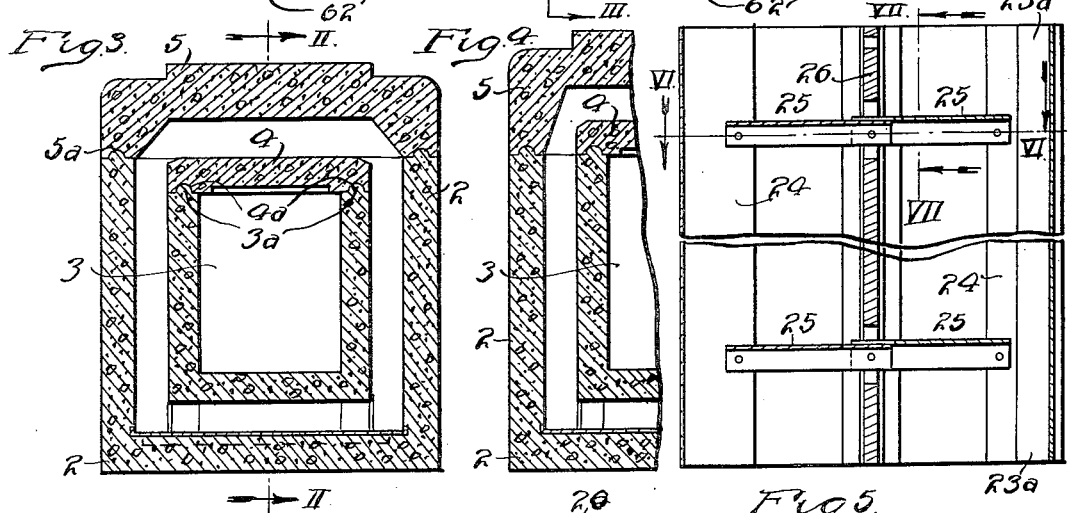
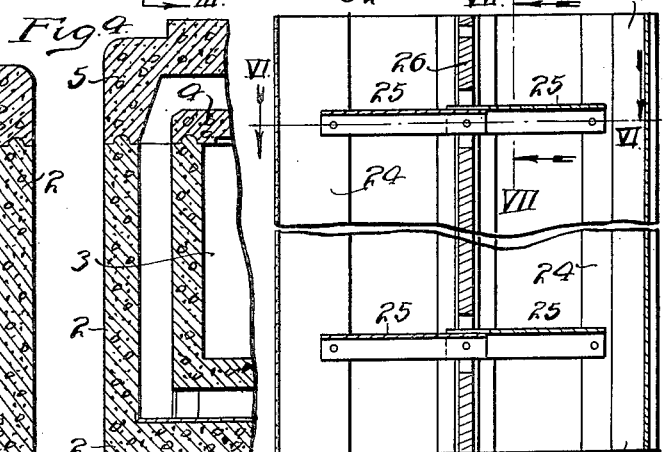
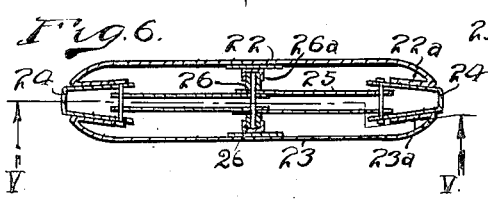
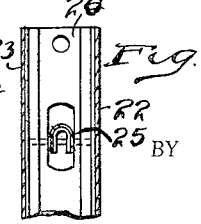
INVENTOR.
GIDEON A. LASLEY.
BY
ATTORNEY.

May 1, 1934.　　　　G. A. LASLEY　　　　1,957,027
MAUSOLEUM AND PROCESS AND APPARATUS FOR MAKING THE SAME
Filed Aug. 22, 1932　　　3 Sheets-Sheet 2
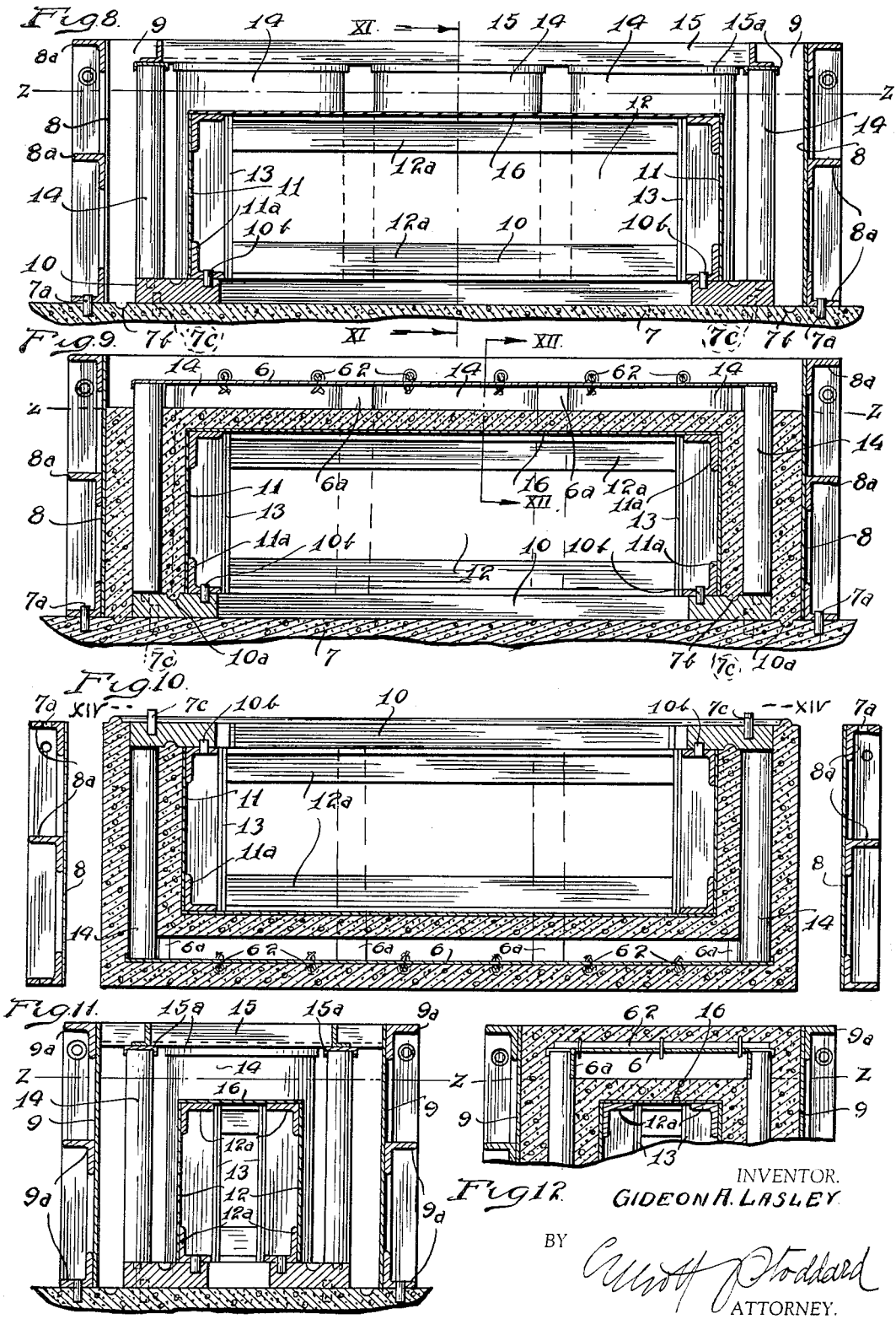
INVENTOR.
GIDEON A. LASLEY
BY
ATTORNEY.

May 1, 1934. G. A. LASLEY 1,957,027
MAUSOLEUM AND PROCESS AND APPARATUS FOR MAKING THE SAME
Filed Aug. 22, 1932   3 Sheets-Sheet 3
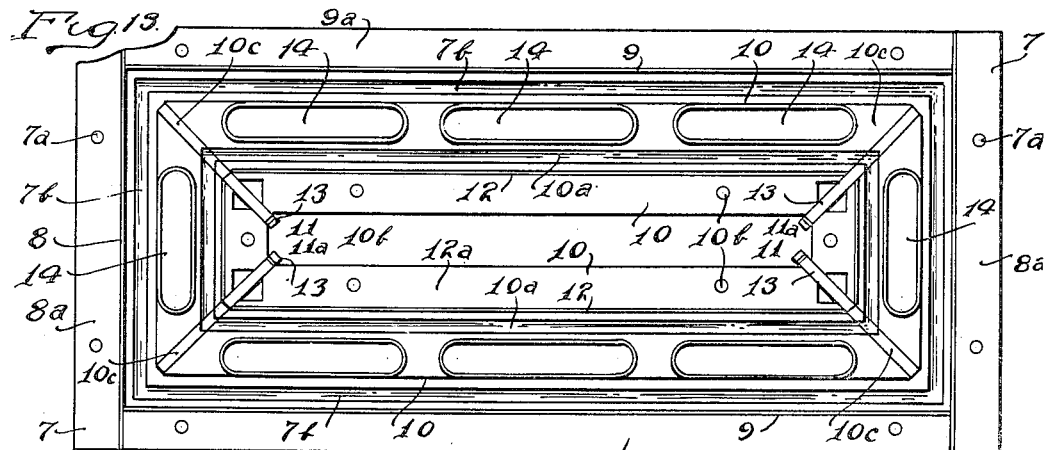
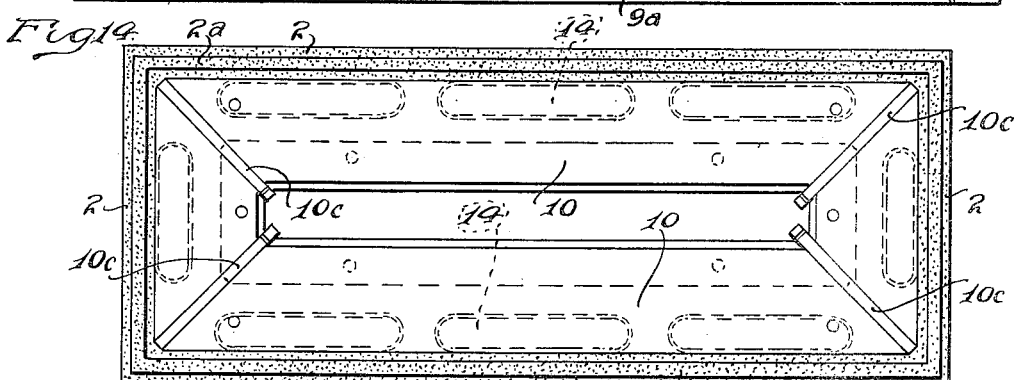
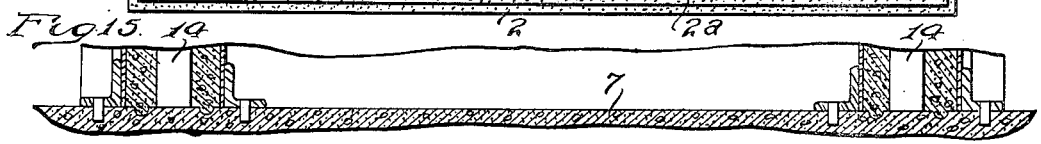
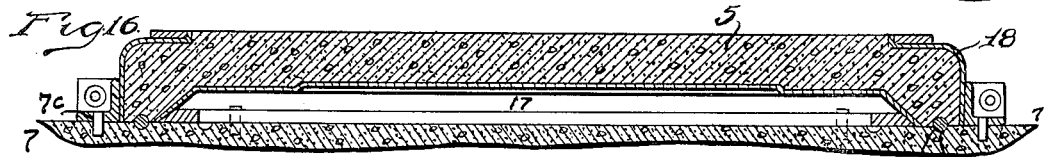
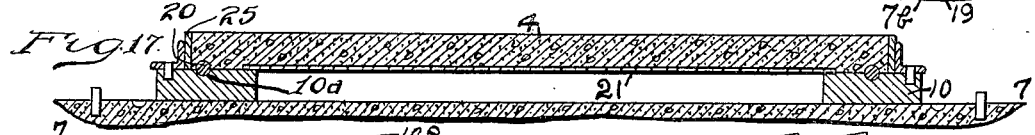
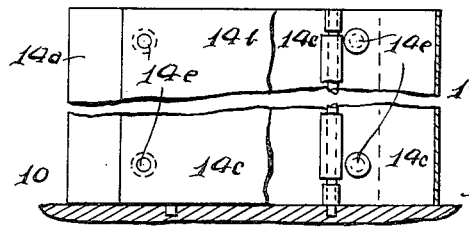
INVENTOR.
GIDEON A. LASLEY.
BY
*Elliott Stoddard*
ATTORNEY Patented May 1, 1934

1,957,027

UNITED STATES PATENT OFFICE 1,957,027

MAUSOLEUM AND PROCESS AND APPARATUS FOR MAKING THE SAME

Gideon A. Lasley, Detroit, Mich.

Application August 22, 1932, Serial No. 629,803

7 Claims. (Cl. 25—130)

My invention relates to mausoleums and the process and apparatus for making the same.

An object of my improvements is to make a unitary improved double chambered construction using an improved apparatus.

I secure this object in the construction and by the apparatus and process illustrated in the accompanying drawings and described in the following specification.

Figure 1 is a plan view of the construction of my invention, partly in section as indicated by the line I, I, I, the covers being removed.

Figure 2 is a section on the line II, II, Figure 1, the covers being in place.

Figure 3 is a section on the line III, III, Figure 2.

Figure 4 is a partial section similar to Figure 3, showing a modified construction.

Figure 5 is a sectional elevation of one form of the vertical collapsible cores, the section being taken on the line V, V, Figure 6.

Figure 6 is a section on the line VI, VI, Figure 5.

Figure 7 is a detail section on the line VII, VII, Figure 5.

Figure 8 is a sectional elevation of the mold for casting the apparatus of Figures 1, 2 and 3.

Figure 9 is a view similar to Figure 8, illustrating a step in the process of making the construction of Figures 1, 2 and 3.

Figure 10 is a view similar to Figure 9 illustrating another step in said process.

Figure 11 is a section on the line XI, XI, Figure 8.

Figure 12 is a detail section on the line XII, XII, Figure 9, illustrating another step in the process.

Figure 13 is a plan view of the apparatus shown in Figure 8, the positioning frame 15 being removed and the collapsible cores 14 only shown in outline.

Figure 14 is a plan view of the apparatus shown in Figure 10, looking down from the plane indicated by the line XIV, XIV, in said figure.

Figure 15 is a detail section illustrating the mode of constructing the modified form of Figure 4.

Figure 16 is a sectional view illustrating a method of forming the cover for the mausoleum.

Figure 17 is a sectional view illustrating the method of forming the cover for the inner chamber.

Figure 18 is a plan view of one form of the upright collapsible cores.

Figure 19 is a partial elevation of the construction of Figure 18, partly broken away to illustrate its construction.

Figure 20 is a perspective view of a portion of the false bottom 6 at and adjacent to one of its corners.

2 and 3 are rectangular chambers having unitary vertical end and side walls and horizontal bottoms. The chamber 3 is located within the chamber 2 and concentric therewith, leaving a uniform space between its walls and the walls of the chamber 2 and between its bottom and the bottom of the chamber 2. The walls of the chambers 2 and 3 are united by vertically extending ribs 32 which are integral with the walls of both chambers and serve to unite the two chambers as an integral construction. 3a is a bead formed around the upper edge of the chamber 3, and 2a is a similar bead formed around the upper edge of the chamber 2. 4 is a cover for the chamber 3 provided around its edge, on its under surface, with a groove 4a adapted to fit over the bead 3a. 5 is a cover for the chamber 2 provided with a groove 5a around its lower edge adapted to fit over the bead 2a on the upper edge of the cover 2.

To make the above described construction I provide a base 7, which may be of any solid material that will permit of positioning dowels. Upon this I erect end plates 8, 8 of thin metal strengthened by angle irons 8a and position them upon the plate by dowels 7a. Around this base adjacent to its edge I form a groove 7b in its upper surface. 9, 9 are side plates similar to the end plates 8, 8 and similarly reenforced by angle irons 9a (Fig. 11) and positioned upon the frame 10. The plates 8 and 9 form the walls of a rectangular enclosure.

Upon the upper surface of the base 7, I place a rectangular frame 10 coaxial with the enclosure 8—9 and having its outer edges properly spaced inward from the walls of the enclosure 8—9, so that the outer edges of said frame shall be as far inside of the groove 7b as the plates 8 and 9 are outside of said groove.

14 indicate vertically extending collapsible cores held in place between the walls 8—9 and 11 and 12 upon the upper surface of the frame 10 and spaced from each other by dowels, with their outer edges rising from the outer edges of said frame. 15 is a positioning frame adapted to be placed upon the tops of the vertical cores 14 to hold said cores in position. To this end the frame 15 is provided with plates 15a having their edges turned down to engage over the ends of the cores 14. 10a is a groove semi-cylindrical in cross section, formed around the upper surface of the frame 10 midway between the edges of said frame.

11, 11 are end plates having strengthening angle irons 11a, 11a, at their upper and lower edges and 12, 12 are side plates having reenforcing angle irons 12a, 12a at their upper and lower edges. The plates 11, 11 and 12, 12 are placed upon the upper surface of the frame 10 so as to form the sides and ends of a rectangular enclosure concentric with the enclosure 8—9, and are held in position upon the frame 10 by dowels 10b. The walls 11 and 12 are spaced inward from the groove 10a, a distance about equal to the distance of the inner portion of the cores 14 outside of said groove. 16 is a plate laid upon the strengthening irons at the upper edges of the plates 11 and 12 so as to form a cover for the constructions formed by said plates when positioned as above described.

The parts above described being located as shown in Figure 8, liquid cement is poured between the walls 8—9 and 11—12, filling the construction to the line Z, Z, Figure 8, which is a sufficient distance above the plate 16 to form the bottom of the inner chamber 3 of sufficient thickness.

6 is a thin metal plate having transverse bars 62 secured to one side thereof and having flanges 6a, 6a cut out of its edges at proper intervals, and at its corners, and turned vertically downward. The edges of this plate are also turned downward as indicated in Figure 20.

The cement having been poured, as above described and illustrated in Figure 9, and its surface brought to a level at the lines Z, Z, the frame 15 is removed from the top of the vertical cores 14 and the plate, 16, is placed on the upper ends of said cores with its turned down edge engaging outside of said cores and the bars 62 upon its outer surface, as shown in Figure 9. The down turned flanges 6a of the plates 6 engage between the vertical cores 14 their end edges engaging the cement at the level Z, Z, and prevent the cement from flowing inward between said cores, when the mold is filled as hereinafter described and the cement flows around the bars 62, so that said bars form reenforcing means for the bottom of the outer chamber and their connection with the plate 6 holds the latter firmly in place.

The mold is then filled with cement and leveled off at the upper edges of the plates 8 and 9 as indicated in Figure 12. In this figure the cement poured after the plate 6 has been placed in position is indicated by a cross lining in the opposite direction to that of the cement poured before said plate is adjusted, but it is to be understood that the cement poured after the plate 6 is in position is united to and becomes integral with, the cement that was poured into the mold before said plate was adjusted. The cement above the plate 6 forms the bottom of the outer chamber and an air space is left between the bottoms of the two chambers.

When the cement has been poured, as above described, and illustrated in Figures 9 and 12, and has become sufficiently set, the whole construction is raised from the base 7 and reversed, bringing what has been the bottom to the top, as shown in Figure 10. The end plates 8, 8 and the side plates 9, 9 are now removed.

The frame 10 is composed of two side pieces and two end pieces, as shown in Figure 14 and between the ends of the end pieces and side pieces are placed the spacing keys 10c.

Said spacing keys are then removed permitting the parts of the frame to be moved inward, or collapsed, and then it can be removed from the mold structure.

The end pieces 11, 11 and the side pieces 12, 12 of the inner walls of the mold are provided with spacing keys 13 therebetween (Figure 13).

The keys 13 are now removed and the walls 11 and 12 collapsed inward and removed from the mold structure. The vertical cores 14 are now collapsed and removed from the mold structure by a vertical movement.

Two forms of the collapsible vertical cores 14 are shown. That shown in Figures 18 and 19 consists of two side plates 14a and 14b, and parts 24a bent into semi-circles between their vertical edges. These are overlapped by the side plates. 14c are spacing plates each of which is pivoted at one end to a pintle of a hinge near one edge of a part 24a, and at the other end engaging against said part near its opposite edge. When the spacing plates 14c are turned inward, as shown in broken lines, the parts 24a are collapsed inward by their resiliency, and the core may be withdrawn from the mold. To more efficiently produce this effect the metal of the parts 24a is thinned at the curved portions to localize the binding action. 4e indicates dowel constructions by which the parts of the core are relatively positioned when the plates are in operative position, as shown in full lines in Figure 18. The pintles of said hinge extend beyond the core to form dowel pins to engage the part upon which they are supported.

Another form of collapsible vertical cores is shown in Figures 5, 6 and 7. In this construction there are two side plates 22 and 23, bent at their edges inward and backward so as to form backwardly diverging surfaces 22a and 23a. Into the space between the surfaces 22a and 23a are inserted wedges 24. 26 is a plate adapted to reciprocate vertically in ways 26a on the interior surfaces of the plates 22 and 23 at the center thereof. 25 represents links pivoted to the wedges 24 and to the plate 26 so as to form a toggle joint at the last named position. By drawing the plate 26 upward the wedges 24 are drawn in and the side pieces 22, 23 may then be moved inward to release the core.

As above described the upper edges of the inner chamber 3 are at a lower level than the upper edges of the outer chamber, as shown in Figures 2 and 3 by an amount equal to the thickness of the frame 10. Should it be desired to have the edges of these two chambers in the same horizontal plane, as shown in Figure 4, the frame 10 may be omitted and the vertical cores 14 placed directly upon the base 7 as illustrated in Figure 15. The construction and operation is the same as above.

The covers are formed as illustrated in Figures 16 and 17.

In Figure 16 the base 7 is shown, having a rod 19 cylindrical in cross section, filling the groove 7b. Over this plate is placed the dish-like construction 17, and around this the frame 18, positioned by suitable dowels 7c upon the base plate 7. The cement is then poured between the parts 17 and 18 filling the framework as illustrated in said figure. The rod 19 forms a groove 5a in the edge of the cover 5 that is adapted to fit over the bead 2a.

For the inner cover the framework 25 is adjusted to position on the frame 10, and a rod 20 cylindrical in cross section is placed in the groove 10a around the edge of said frame. A plate 21 is placed over the frame 10 to close its central opening. Cement is then poured upon the plate 21 and upper surface of the frame 10 until it comes to a level at the upper edge of the framework 25. A cover for the inner chamber is thus constructed, the rods 20 forming a groove 4a that fits over the bead 3a.

With this construction any moisture is effectively taken up by the air between the two chambers and dissipated through the cover of the outer chamber.

The ribs 32 joining the chambers at the corners very materially strengthen the entire structure so that it may be moved without danger of breaking.

What I claim is:—

1. In a mold for the purpose described, a base, two structures one within the other having spaced walls resting on said base, the walls of the inner structure being of less height than the walls of the outer structure, said inner structure being closed at its upper surface, cores extending from said base between said walls to a level intermediate the levels of the edges of said outer and inner walls and a cover closing the space between the upper ends of said cores, the construction being such as to enclose a space at the upper portion of the space between the upper surface of said inner structure and the upper ends of said cores, for the purpose described.

2. In a mold for the purpose described, a base, two structures one within the other having spaced walls resting on said base, the walls of the inner structure being of less height than the walls at the outer structure, said inner structure being closed at its upper surface, cores spaced from each other and extending from said base between said walls to a level intermediate the levels of the edges of said outer and inner walls, and means for closing the spaces between said cores at and adjacent to their upper ends, for the purpose described.

3. In a mold for the purpose described, a base, two structures one within the other having spaced walls resting on said base, the walls of the inner structure being of less height than the walls of the outer structure, said inner structure being closed at its upper surface, cores spaced from each other and extending from said base between said walls to a level intermediate the levels of the edges of said outer and inner walls, and a cover plate for the upper ends of said cores closing the space between said cores at and adjacent to their upper ends, for the purpose described.

4. In a mold for the purpose described, a base, two structures one within the other having spaced walls resting on said base, the walls of the inner structure being of less height than the walls of the outer structure, said inner structure being closed at its upper surface, cores extending from said base between said walls to a level intermediate the levels of the edges of said outer and inner walls and a cover closing the space between the upper ends of said cores, the construction being such as to enclose a space at the upper portion of the space between the upper surface of said inner structure and the upper ends of said cores, for the purpose described, and reenforcing bars attached to, and extending along the outer surface of said cover.

5. In a mold for the purpose described, a base, two structures one within the other having spaced walls resting on said base, the walls of the inner structure being of less height than the walls of the outer structure, said inner structure being closed at its upper surface, cores extending from said base between said walls to a level intermediate the levels of the edges of said outer and inner walls and a cover closing the space between the upper ends of said cores, the construction being such as to enclose a space at the upper portion of the space between the upper surface of said inner structure and the upper ends of said cores, for the purpose described, said cores being collapsible and removable.

6. In a mold for the purpose described, a base, two structures one within the other having spaced walls resting on said base, the walls of the inner structure being of less height than the walls of the outer structure, said inner structure being closed at its upper surface, cores extending from said base between said walls to a level intermediate the levels of the edges of said outer and inner walls and a cover closing the space between the upper ends of said cores, the construction being such as to enclose a space at the upper portion of the space between the upper surface of said inner structure and the upper ends of said cores, for the purpose described, the walls of said inner structure being collapsible and removable.

7. The process of molding, consisting in providing an outer and inner structure, the inner structure being of less height than the outer structure, placing cores between said outer and inner structure, extending to a level between the level of the upper edges of the inner and outer structure pouring a liquid cement to a level above said inner structure sufficient to constitute a bottom of an inner chamber, enclosing the space between the surface of the cement and the ends of said cores above the same and then pouring cement to a level above the enclosure of said enclosed space sufficient to form the bottom of the outer chamber, allowing the cement to set and then withdrawing the cores.

GIDEON A. LASLEY.